(No Model.)

J. A. BUBIER.
GRASS CATCHER FOR LAWN MOWERS.

No. 530,084. Patented Dec. 4, 1894.

Witnesses
B. Bristow Adams
C. H. Seaton

Joseph A. Bubier,
Inventor
By Geo. D. Mitchell
Attorney

THE NORRIS PETERS CO., PHOTO-LITHO., WASHINGTON, D. C.

UNITED STATES PATENT OFFICE.

JOSEPH A. BUBIER, OF BOSTON, MASSACHUSETTS.

GRASS-CATCHER FOR LAWN-MOWERS.

SPECIFICATION forming part of Letters Patent No. 530,084, dated December 4, 1894.

Application filed April 25, 1894. Serial No. 508,977. (No model.)

*To all whom it may concern:*

Be it known that I, JOSEPH A. BUBIER, a citizen of the United States, residing at Boston, in the county of Suffolk and State of Massachusetts, have invented certain new and useful Improvements in Grass-Catchers for Lawn-Mowers; and I do hereby declare the following to be a full, clear, and exact description of the invention, such as will enable others skilled in the art to which it appertains to make and use the same.

My invention relates to certain new and useful improvements in grass catchers for lawn mowers.

It has for its object to provide an appliance which shall be easily adjustable, within a certain range, to mowers of various widths of cut, which shall allow the grass to be emptied by a simple operation, and finally which shall be substantial and at the same time not expensive. In order to attain these objects I have devised the construction and arrangement of parts illustrated in the accompanying drawings, wherein—

Figure 1:
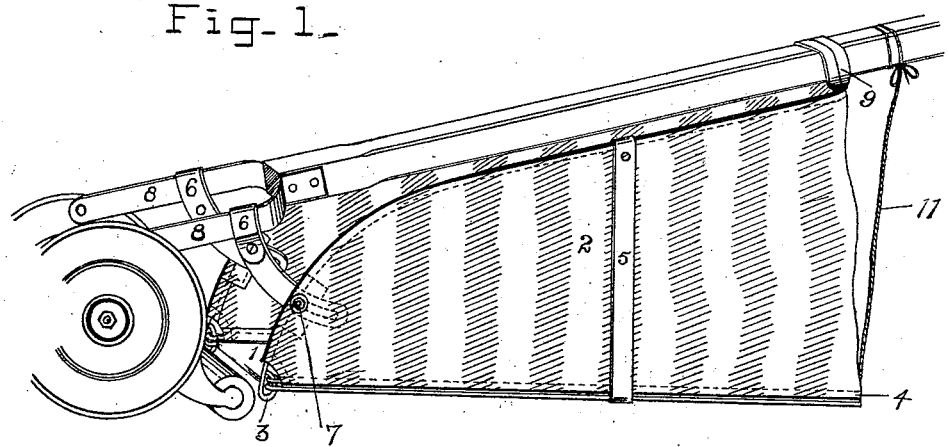
Figure 2:
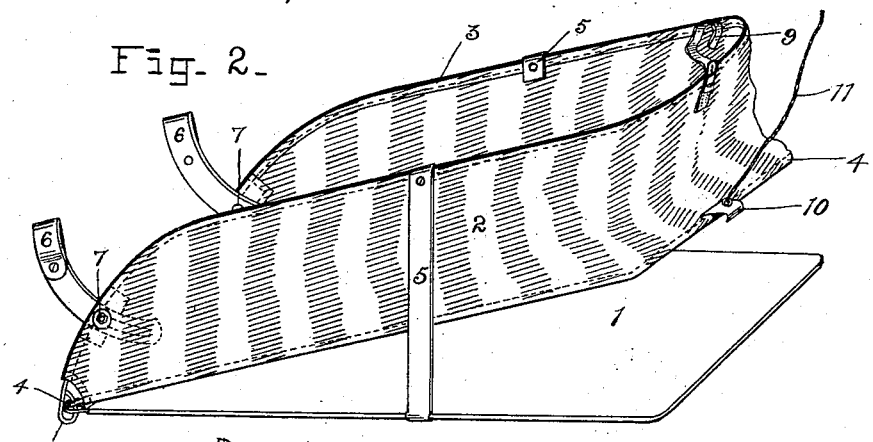
Figure 3:
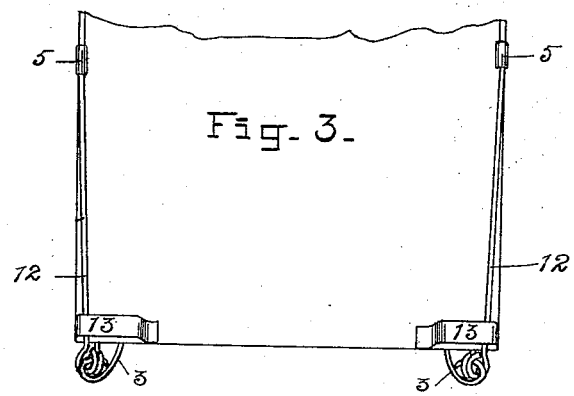

Figure 1 is a general view showing my grass catcher attached to a lawn mower. Fig. 2 is a perspective view of my catcher, showing the manner of lifting the inclosing curtain from the bottom to allow the withdrawal of the grass; and Fig. 3 is a bottom view of the catcher, illustrating the width-adjusting feature.

The figures of reference where they occur in the different views indicate the same parts.

1 is the bottom of the catcher, rectangular in form, made of galvanized iron or similar appropriate material. 2 is an inclosing curtain, of canvas or the like. This curtain is supported at the top by the fixed wire frame 3, eyed at its ends to the rim wire 12 of the bottom, as shown. At the bottom it is supported by the wire frame 4, whose ends are likewise eyed to the ends of the top curtain frame 3, so as to form a hinge at that point, as shown. Lateral strips 5, of galvanized iron or the like, connect the bottom of the catcher 1 with the top curtain frame 3, to support the latter at a fixed height.

In order to attach the catcher to the mower I provide the clips 6, which are adjustably fixed to the top frame 3 of the curtain at 7, as shown, and adapted at their opposite ends to clamp round the handle braces 8 (Fig. 1) of the mower. This arrangement allows the catcher to be adjusted nearer or farther from the mower, as the particular construction of the mower or other conditions may require. At the rear end the catcher is supported by a leather strap or the like, 9, adapted to buckle round the handle of the mower.

The lower curtain frame 4 is provided at its rear with a self-locking catch 10, which engages with the bottom 1 to hold the inclosing curtain tightly down against the bottom when in use. To this catch is attached a cord 11, the upper end of which may be tied to the handle of the mower, for convenience.

Referring now to Fig. 3, 12, 12 is the rim wire of the bottom, held rigid at 5, 5. The forward ends are allowed lateral movement within the guide strips 13, fixed to the bottom. This construction allows the catcher to automatically adjust itself to any ordinary-sized mower, the wires 12 freely moving within the guides 13 and so bringing the sides of the inclosing curtain nearer together or farther apart as the case may be.

My device being constructed and arranged as described, its operation will readily be understood.

The catcher is attached to the mower by means of the adjustable clips 6 and the supporting strap 9. When the catcher becomes filled with grass the operator pulls the cord 11, which releases the catch 10 from the bottom 1 and raises the curtain 2, as shown in Fig. 2. The grass may now be thrown out of the catcher by a simple movement of the foot, without stooping down, whereupon the string is released and the catch 10 again engages the bottom automatically, or by simply pressing with the toe. The whole operation requires but a moment.

Having thus described my invention, what I claim, and desire to secure by Letters Patent, is—

1. The combination with a lawn mower of a receptacle for grass adjustably attached thereto, said receptacle consisting of a stationary bottom and an inclosing curtain separable therefrom.

2. The combination with a lawn mower of a receptacle for grass adjustably attached thereto, said receptacle consisting of a stationary bottom, an upper frame fixed with reference to said bottom, a lower frame capable of being lifted from said bottom and an inclosing curtain supported by said upper and lower frames.

3. A grass catcher for lawn mowers consisting of a stationary bottom, a U-shaped upper frame connected at its free ends with said bottom, means for holding said upper frame in other respects at a distance above said bottom, a U-shaped lower frame having its free ends hinged to said bottom, an inclosing curtain supported by said upper and lower frames, means for detachably holding said lower frame in close relation to said bottom and means for adjustably attaching said grass catcher to a lawn mower.

4. A grass catcher for lawn mowers consisting of a stationary bottom, an upper frame supported at a fixed height therefrom, a lower frame capable of being lifted from said bottom, an inclosing curtain supported by said upper and lower frames surrounding three sides of said bottom, the free sides of said inclosing curtain having lateral movement independent of said bottom, and means for adjustably attaching said catcher to a lawn mower.

5. A grass catcher for lawn mowers consisting of a stationary bottom, having a wire 12 along each side, fixed about midway of its length but left free at its forward end for lateral movement within a guide 13, a U-shaped upper frame 3 having its downwardly curving free ends connected with the free ends of said side wires 12 and fixed in other respects at a distance above said bottom by supports 5, clips 6 adapted to engage the braces 8 of the mower handle and slotted at their opposite ends to allow adjustable connection with the frame 3 by means of the bolt 7, an inclosing curtain supported by said upper and lower frames, a catch 10 for retaining said lower frame in close relation to said bottom, a controlling cord 11 for releasing said catch and a strap 9 for adjustably attaching the upper frame 3 to the handle of the mower, substantially as described.

In testimony whereof I affix my signature in presence of two witnesses.

JOSEPH A. BUBIER.

Witnesses:
GEO. R. BARR,
VINE D. BALDWIN.